(12) United States Patent
Murai et al.

(10) Patent No.: US 7,853,672 B2
(45) Date of Patent: Dec. 14, 2010

(54) SERVER DEVICE, CONTROL INSTRUCTION PROCESSING METHOD THEREFOR, AND TERMINAL DEVICE

(75) Inventors: Shinya Murai, Kawasaki (JP);
Masataka Goto, Yokohama (JP);
Kensaku Yamaguchi, Yokohama (JP);
Yasuyuki Nishibayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 577 days.

(21) Appl. No.: 11/790,685

(22) Filed: Apr. 26, 2007

(65) Prior Publication Data
US 2007/0288557 A1 Dec. 13, 2007

(30) Foreign Application Priority Data
Jun. 8, 2006 (JP) ............................. 2006-159776

(51) Int. Cl.
*G06F 15/177* (2006.01)
(52) U.S. Cl. ....................... 709/220; 358/450
(58) Field of Classification Search ................. 709/203, 709/219, 247, 220; 358/450
See application file for complete search history.

(56) References Cited

U.S. PATENT DOCUMENTS

| | | | | |
|---|---|---|---|---|
| 5,617,333 A | * | 4/1997 | Oyamada et al. | 709/247 |
| 5,796,957 A | * | 8/1998 | Yamamoto et al. | 709/251 |
| 5,801,844 A | * | 9/1998 | Yamakawa et al. | 358/450 |
| 5,822,541 A | * | 10/1998 | Nonomura et al. | 709/247 |
| 5,933,149 A | | 8/1999 | Mori et al. | |
| 6,889,365 B2 | | 5/2005 | Okahara et al. | |
| 7,496,555 B2 | * | 2/2009 | Margolus | 707/1 |
| 2004/0189598 A1 | | 9/2004 | Fujita et al. | |
| 2005/0108365 A1 | * | 5/2005 | Becker et al. | 709/219 |

FOREIGN PATENT DOCUMENTS

| | | |
|---|---|---|
| CN | 1612568 | 5/2005 |
| JP | 07-044495 | 2/1995 |
| JP | 09-282080 | 10/1997 |
| JP | 2000-057094 | 2/2000 |
| JP | 2004-86550 | 3/2004 |
| JP | 2004-295304 | 10/2004 |

OTHER PUBLICATIONS

Office Action in Chinese Application No. 200710104042X dated Mar. 20, 2009, and English-language translation thereof.
Okada M et al., "A Study of Distributed Environment for Three-Dimensional Image Processing Using Extended Server-Client Model", Systems and Computers in Japan; vol. 24, No. 4 1993, pp. 13-22; XP000504637.

(Continued)

*Primary Examiner*—Saleh Najjar
*Assistant Examiner*—Marie Georges Henry
(74) *Attorney, Agent, or Firm*—Nixon & Vanderhye, PC

(57) ABSTRACT

There is provided a server device including a thinning processing unit which, if an object of operation with control instructions received by a reception unit is an application program stored in a storage unit in association with the control instruction, executes thinning processing for the plurality of control instructions received using a thinning processing method stored in association with the control instruction.

16 Claims, 9 Drawing Sheets

OTHER PUBLICATIONS

Morrow P. et al. "Client/Server Image Processing: Distributing Data and Algorithms"; IEE Journal 1999; Nov. 18, 1999; pp. 15-1; XP006502624.

EP Extended Search report, Jul. 6, 2007.

Japanese Office Action issued Sep. 19, 2008, in JP 2006-159776, with English Translation.

Office Action in Japanese Application No. 2006-159776 dated Aug. 14, 2009 and English-language translation thereof.

2nd Chinese Office Action of Chinese Application No. 2007101004042X dated Sep. 11, 2009, 6 pages.

* cited by examiner

|  | WINDOW TYPE | MOVE COMMAND |
|---|---|---|
| APPLICATION A | TEXT INPUT AREA | TO BE PROCESSED EVERY 100 msec |
|  | MENU AREA | TO BE PROCESSED EVERY 100 msec |
|  | TITLE BAR AREA | TO BE PROCESSED EVERY 100 msec |
|  | DRAWING AREA | NOT TO BE THINNED OUT |
| APPLICATION B |  | NOT TO BE THINNED OUT |
| OTHER |  | TO BE PROCESSED EVERY 100 msec | ness of the quality of a display image to some extent.

SERVER DEVICE, CONTROL INSTRUCTION PROCESSING METHOD THEREFOR, AND TERMINAL DEVICE

CROSS REFERENCE TO RELATED APPLICATIONS

This application is based upon and claims the benefit of priority from the prior Japanese Patent Application No. 2006-159776, filed on Jun. 8, 2006, the entire contents of which are incorporated herein by reference.

BACKGROUND OF THE INVENTION

1. Field of the Invention

The present invention relates to a server device, a control instruction processing method therefor, and a terminal device.

2. Related Art

When a user performs an input operation using an input device such as a mouse, stylus, or keyboard, a client device interprets an input signal input from the input device. With this interpretation, the client device generates an input command such as "move the position of a pointer" or "input a key" and transmits the input command to a server device via a network.

The server device receives and processes the input command. With this operation, server device generates image data for display on the client device and transfers the image data to the client device via the network to display it (see, e.g., JP-A 2004-295304 (Kokai)).

In such remote control systems, the process of first compressing and transmitting the image data of an entire screen for display on a client device and thereafter compressing and transmitting only the image data of a modified area at predetermined time intervals, for example, is widely adopted as a way to compress and transmit image data for display on the client device (see, e.g., JP-A 2004-86550 (Kokai)).

In each of the remote control systems, if a server device frequently makes a modification to a large area of a display screen of a client device as the result of processing an input command, the time required to generate and transmit the image data of a modified area becomes longer.

In this case, there arises the problem of an increase in the time (delay time) from when a user performs an input operation in the client device to when image data corresponding to the input operation is displayed on the client device.

SUMMARY OF THE INVENTION

The present invention provides a server device which can adaptively control the level of thinning for an input command and shorten delay time while maintaining the quality of a display image, a control instruction processing method therefor, and a terminal device.

According to an aspect of the present invention, there is provided a server device which receives a control instruction transmitted from a terminal device via a network and generates and transmits image data to be displayed on the terminal device in accordance with the received control instruction, including a storage unit configured to store a set of the control instruction, an application program serving as an object of operation with the control instruction, and a thinning processing method for the control instruction associated with one another, a reception unit configured to receive a plurality of the control instructions transmitted from the terminal device, a thinning processing unit configured to, if an object of operation with the control instructions received by the reception unit is the application program in one of the set stored in the storage unit in association with the control instruction, execute thinning processing for the plurality of control instructions received using the thinning processing method in the one of the set stored in association with the control instruction, an image data generation unit configured to generate the image data to be displayed on the terminal device in accordance with the control instructions after the thinning processing, and a transmission unit configured to transmit the generated image data to the terminal device.

According to another aspect of the present invention, there is provided a server device which receives a control instruction transmitted from a terminal device via a network and generates and transmits image data to be displayed on the terminal device in accordance with the received control instruction, including a storage unit configured to store a set of the control instruction, a display area of a display screen of the terminal device serving as an object of operation with the control instruction, and a thinning processing method for the control instruction associated with one another, a reception unit configured to receive a plurality of the control instructions transmitted from the terminal device, a thinning processing unit configured to, if an object of operation with the control instructions received by the reception unit is the display area in one of the set stored in the storage unit in association with the control instruction, execute thinning processing for the plurality of control instructions received using the thinning processing method in the one of the set stored in association with the control instruction, an image data generation unit configured to generate the image data to be displayed on the terminal device in accordance with the control instructions after the thinning processing, and a transmission unit configured to transmit the generated image data to the terminal device.

According to another aspect of the present invention, there is provided a server device control instruction processing method for receiving a control instruction transmitted from a terminal device via a network and generating and transmitting image data to be displayed on the terminal device in accordance with the received control instruction, including a step of storing, in a storage unit, a set of the control instruction, an application program serving as an object of operation with the control instruction, and a thinning processing method for the control instruction associated with one another, a step of receiving a plurality of the control instructions transmitted from the terminal device, a step of, if an object of operation with the control instructions received is the application program in one of the set stored in the storage unit in association with the control instruction, executing thinning processing for the plurality of control instructions received using the thinning processing method in the one of the set stored in association with the control instruction, a step of generating the image data to be displayed on the terminal device in accordance with the control instructions after the thinning processing, and a step of transmitting the generated image data to the terminal device.

According to another aspect of the present invention, there is provided a server device control instruction processing method for receiving a control instruction transmitted from a terminal device via a network and generating and transmitting image data to be displayed on the terminal device in accordance with the received control instruction, including a step of storing, in a storage unit, a set of the control instruction, a display area of a display screen of the terminal device serving as an object of operation with the control instruction, and a thinning processing method for the control instruction associated with one another, a step of receiving a plurality of the control instructions transmitted from the terminal device, a step of, if an object of operation with the control instructions received is the display area in one of the set stored in the storage unit in association with the control instruction, executing thinning processing for the plurality of control instructions received using the thinning processing method in the one of the set stored in association with the control instruction, a step of generating the image data to be displayed on the terminal device in accordance with the control instructions after the thinning processing, and a step of transmitting the generated image data to the terminal device.

According to another aspect of the present invention, there is provided a terminal device which transmits a control instruction input from an input unit to a server device via a network and receives and displays image data transmitted from the server device via the network, including an application state storage unit configured to store application state information indicating an operating state of an application program transmitted from the server device via the network, a storage unit configured to store a set of the control instruction, an application program serving as an object of operation with the control instruction, and a thinning processing method for the control instruction associated with one another, an input unit configured to input a plurality of the control instructions, a thinning processing unit configured to identify an object of operation with the control instructions input by the input unit using the application state information stored in the application state storage unit and, if the identified object of operation with the control instructions is the application program in one of the set stored in the storage unit in association with the control instruction, execute thinning processing for the plurality of control instructions input using the thinning processing method in the one of the set stored in association with the control instruction, and a transmission unit configured to transmit the control instructions after the thinning processing to the server device via the network.

According to another aspect of the present invention, there is provided a terminal device which transmits a control instruction input from an input unit to a server device via a network and receives and displays image data transmitted from the server device via the network, including a display area state storage unit configured to store display area state information indicating a display state of each of display areas constituting a display screen of the terminal device transmitted from the server device via the network, a storage unit configured to store a set of the control instruction, one of the display areas serving as an object of operation with the control instruction, and a thinning processing method for the control instruction associated with one another, an input unit configured to input a plurality of the control instructions, a thinning processing unit configured to identify an object of operation with the control instructions input by the input unit using the display area state information stored in the display area state storage unit and, if the identified object of operation with the control instructions is the display area in one of the set stored in the storage unit in association with the control instruction, execute thinning processing for the plurality of control instructions input using the thinning processing method in the one of the set stored in association with the control instruction, and a transmission unit configured to transmit the control instructions after the thinning processing to the server device via the network.

DETAILED DESCRIPTION OF THE INVENTION

Embodiments of the present invention will be explained below with reference to the drawings.

Figure 1:
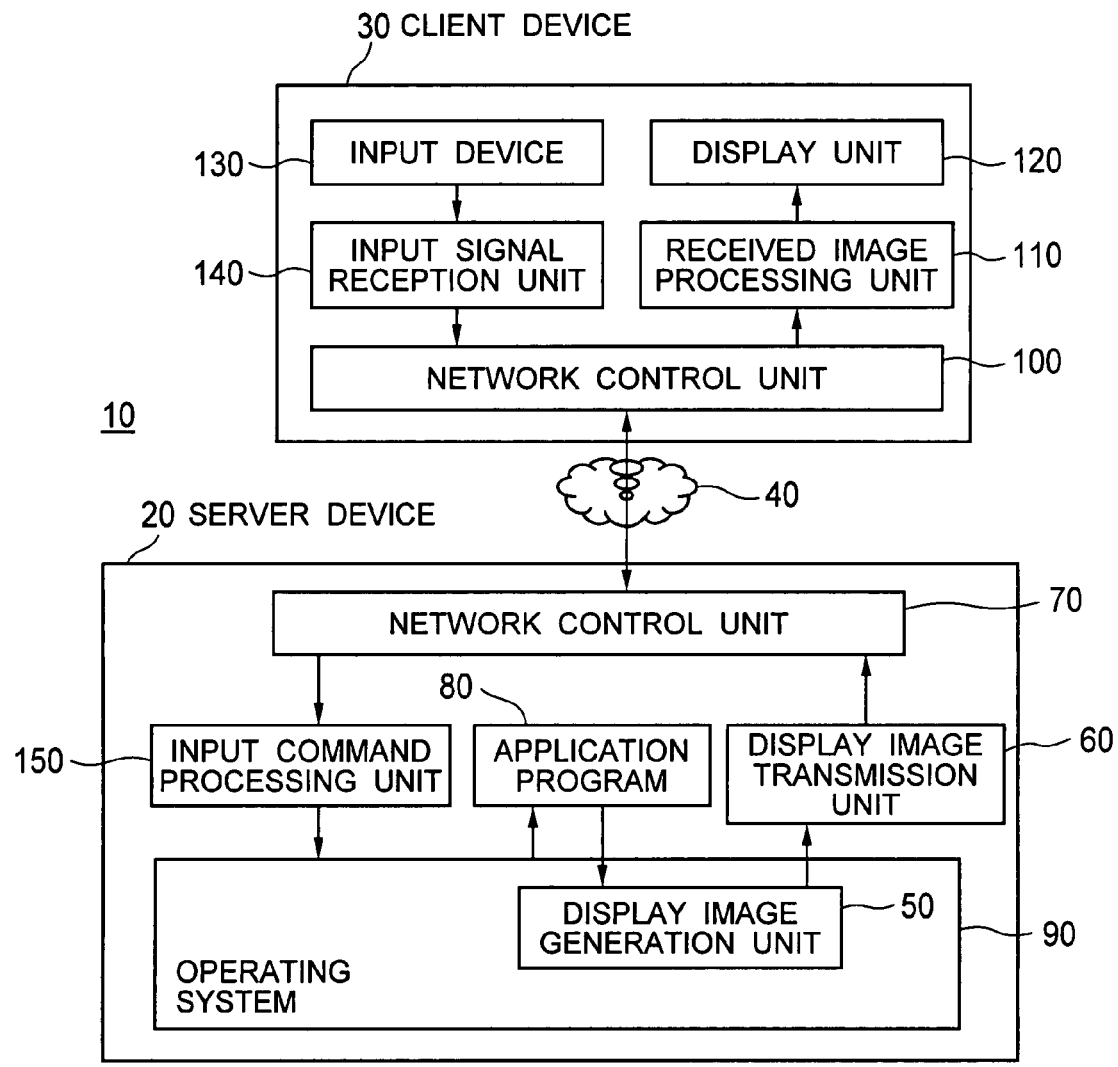
FIG. 1 is a block diagram showing the configuration of a remote control system according to an embodiment of the present invention.

FIG. 1 shows the configuration of a remote control system 10 according to an embodiment of the present invention. The remote control system 10 is built by connecting a server device 20 and a client device 30 via a network 40.

In this embodiment, the sever device 20 first transmits, to the client device 30, the data of an entire image (to be referred to as entire image data hereinafter) to be displayed on the client device 30 and thereafter transmits the image data of a modified area to the client device 30. When transmitting the image; data of a modified area, the server device 20 also transmits the positional information (e.g., a block number or the coordinates of the modified area) of the image data in an entire display screen of the client device 30. Note that the image data (including the positional information) of a modified area will be referred to as modified image data hereinafter.

Figure 2:
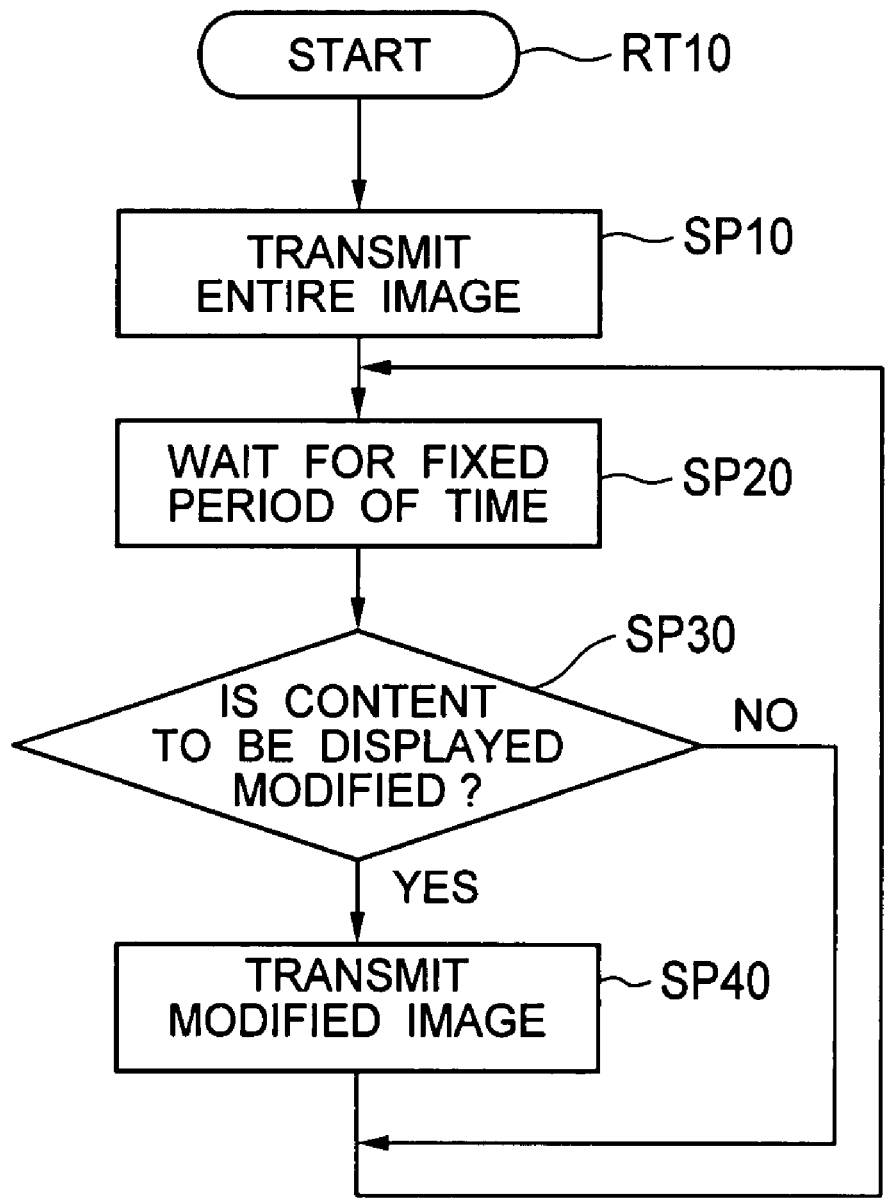
FIG. 2 is a flowchart showing an image data transfer procedure.

FIG. 2 shows an image data transfer procedure RT10 to be performed by the server device 20. Referring to FIG. 2, when the server device 20 enters the image data transfer procedure. RT10, it transmits entire image data to the client device 30 in step SP10.

In step SP20, the server device 20 waits for a fixed period of time and then shifts to step SP30. In step SP30, the server device 20 confirms whether an image to be displayed on the client device 30 is different from the transmitted image.

If an affirmative result is obtained in step SP30, the server device 20 generates modified image data, transmits the modified image data to the client device 30, and returns to step SP20. On the other hand, if a negative result is obtained in step SP30, the server device 20 returns to step SP20 and further waits for the fixed period of time.

The server device 20 executes image data transfer processing with a display image generation unit 50 and a display image transmission unit 60. The display image generation unit 50 generates image data serving as an object of display to be displayed on the client device 30. The display image transmission unit 60 transmits image data generated by the display image generation unit 50 to the client device 30 via a network control unit 70.

More specifically, the display image generation unit 50 sends out entire image data to the display image transmission unit 60 at the start of the image data transfer processing. When an application program 80 issues a draw instruction to the display image generation unit 50 formed in an operating system (OS) 90 after that, the display image generation unit 50 generates modified image data for display on the client device 30 on the basis of the given draw instruction and sends out the modified image data to the display image transmission unit 60.

The display image transmission unit 60 holds and compresses modified image data supplied at predetermined time intervals (a plurality of pieces of modified image data if modifications are frequently made) and transmits the obtained compressed modified image data to the client device 30 via the network control unit 70.

Figure 3:
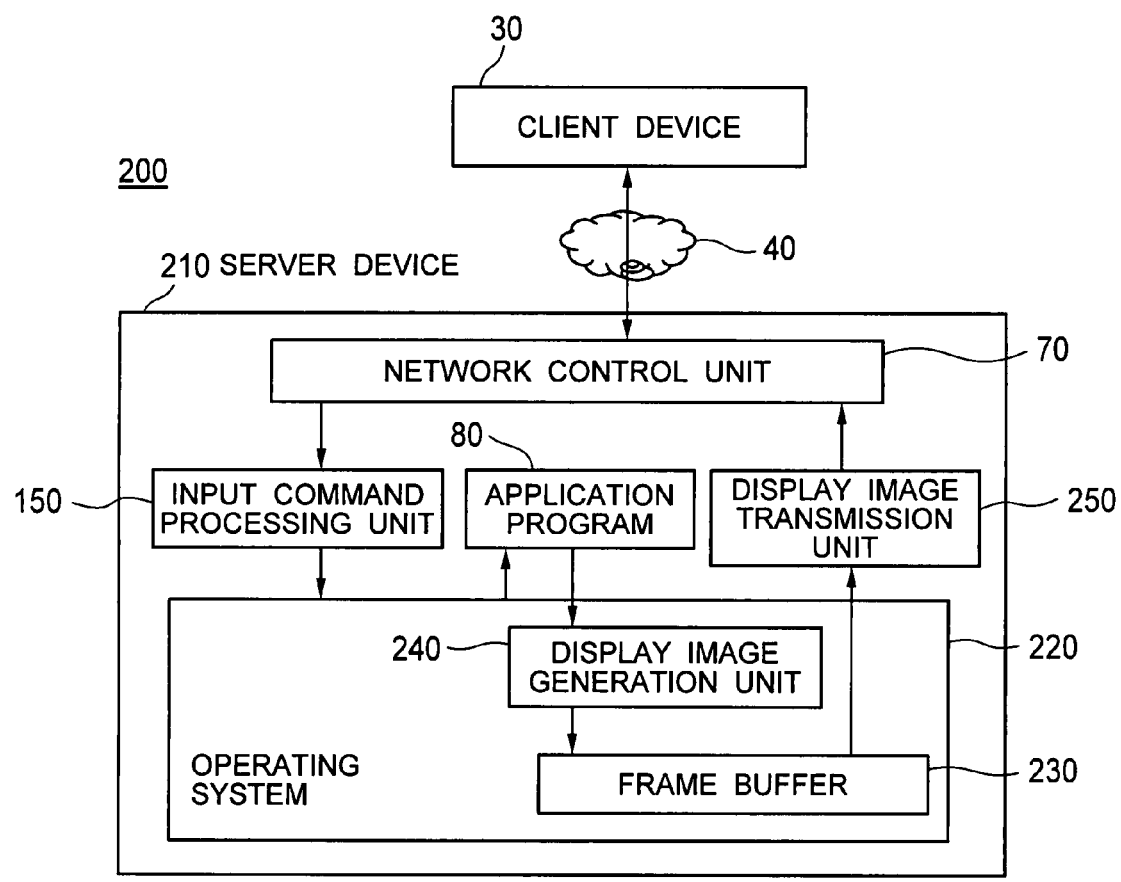
FIG. 3 is a block diagram showing the configuration of a remote control system according to a modification.

FIG. 3 shows image data transfer processing in the server device 20 according to a modification. In a server device 210 of a remote control system 200 of this modification, an operating system 220 has a frame buffer 230 which holds entire image data for display on the client device 30.

When the application program 80 issues a draw instruction to a display image generation unit 240 in the operating system 220, the display image generation unit 240 generates entire image data for display on the client device 30 on the basis of the given draw instruction and writes the entire image data into the frame buffer 230.

A display image transmission unit 250 has a frame buffer (not shown) which holds already transmitted image data. The display image transmission unit 250 obtains entire image data from the frame buffer 230 of the operating system 220, compresses the entire image data, and transmits it to the client device 30 via the network control unit 70, at the start of image data transfer processing. At this time, the display image transmission unit 250 writes the transmitted entire image data into its frame buffer.

After that, the display image transmission unit 250 compares the entire image data held in the frame buffer 230 of the operating system 220 with the entire image data held in its frame buffer at a time when the entire image data held in the frame buffer 230 of the operating system 220 is updated or at predetermined time intervals and thereby extracts modified image data. The display image transmission unit 250 compresses the extracted modified image data and transmits it to the client device 30 via the network control unit 70. At this time, the display image transmission unit 250 overwrites the image data of a corresponding area of the entire image data held in its frame buffer with the modified image data.

Figure 4:
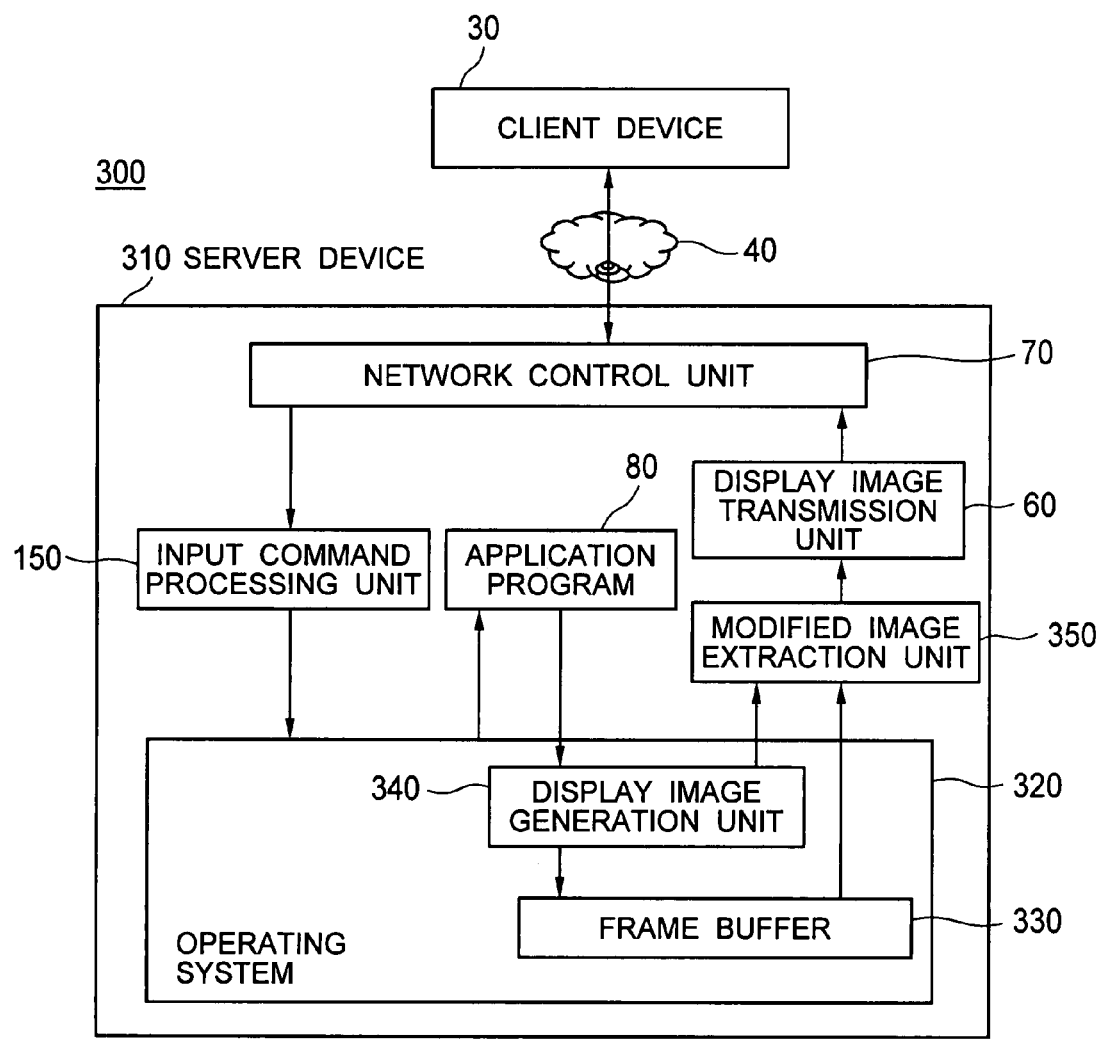
FIG. 4 is a block diagram showing the configuration of a remote control system according to another modification.

FIG. 4 shows image data transfer processing in the server device 20 according to another modification. In a server device 310 of a remote control system 300 of this modification, a display image generation unit 340 in an operating system 320 generates entire image data for display on the client device 30 on the basis of a draw instruction given from the application program 80 and writes the entire image data into a frame buffer 330, as in the above-described server device 210.

At this time, the display image generation unit 340 notifies a modified image extraction unit 350 of information on the image data of a modified area of the entire image data as modified area information. Note that in this case, the display image generation unit 340 may make a notification of modified area information every time it generates entire image data or make a notification of respective pieces of modified area information for a plurality of pieces of entire image data at one time after generating the plurality of pieces of entire image data.

The modified image extraction unit 350 extracts modified image data from the entire image data held in the frame buffer 330 on the basis of modified area information, notification of which is made, and sends out the modified image data to the display image transmission unit 60. The display image transmission unit 60 compresses the modified image data and transmits it to the client device 30 via the network control unit 70.

Note that although in the server devices 210 and 310, the frame buffers 230 and 330 are respectively provided in the operating systems 220 and 320, image data transfer processing may be performed using entire image data stored in a VRAM (video RAM), without providing the frame buffers 230 and 330.

Referring back to FIG. 1, the client device 30 sends out compressed modified image data transmitted from the server device 20 to a received image processing unit 110 via a network control unit 100. The received image processing unit 110 decodes (decompresses) the received compressed modified image data and then sends out the obtained modified image data to a display unit 120. The display unit 120 displays the modified image data in a desired area of a display screen. At this time, the display unit 120 displays an image corresponding to the modified image data at a position indicated by positional information transmitted together with the modified image data.

When a user performs an input operation using an input device 130 such as a mouse, stylus, or keyboard in the client device 30, an input signal reception unit 140 interprets an input signal input from the input device 130. With this interpretation, the input signal reception unit 140 generates an input command such as "move the position of a pointer" or "input a key" and transmits the input command to the server device 20 via the network control unit 100 serving as a transmission/reception unit and the network 40 in sequence.

The server device 20 receives an input command with the network control unit 70 serving as a transmission/reception unit. The server device 20 notifies the operating system 90 of the received input command and thereby requests the operating system 90 to process the input command.

Note that an input command is obtained from the input device 130 such as a mouse or stylus, is information containing the type of a command (e.g., movement of a pointer, a press of a left button, or a press of a right button) and a position where the command is issued (e.g., the coordinates of a destination (or a relative position to a position where a command is issued the last time) in the case where the command is issued by movement of the pointer or a position where a button is pressed), and is composed of a plurality of control instructions.

As examples of a method for requesting the operating system 90 to process an input command, there are available a method including building a virtual input device driver and requesting the operating system 90 using the built input device driver and a method including requesting the operating system 90 using an application program interface (API) of the operating system 90. In short, any method may be used as far as it can notify the operating system 90 or the application program 80 serving as an object of operation of the input command.

In this embodiment, an input command processing unit 150 performs thinning processing for an input command before notifying the operating system 90 of the input command. More specifically, the input command processing unit 150 has thinning control information indicating the relationship among the details of an input command, the type of an application program or window serving as an object of operation with the input command, and a thinning processing method for the input command. The input command processing unit 150 executes thinning processing for received input commands (the process of reducing the amount of data of the input commands) on the basis of the thinning control information and the input commands and then notifies the operating system 90 of the input commands.

As examples of a method for confirming the type of an application program or window serving as an object of operation with an input command, there are available a method including obtaining, from the operating system 90, the type of an application program or window which serves as an object of operation and whose title bar has changed in display color (which has the focus) and a method including obtaining, from the operating system 90, the type of an application program or window whose display area covers the position of an object of operation included in an input command.

When the input command processing unit 150 obtains the type of an application program or window serving as an object of operation with an input command, it determines a thinning processing method for an input command using the thinning control information.

Figures 5, 6:
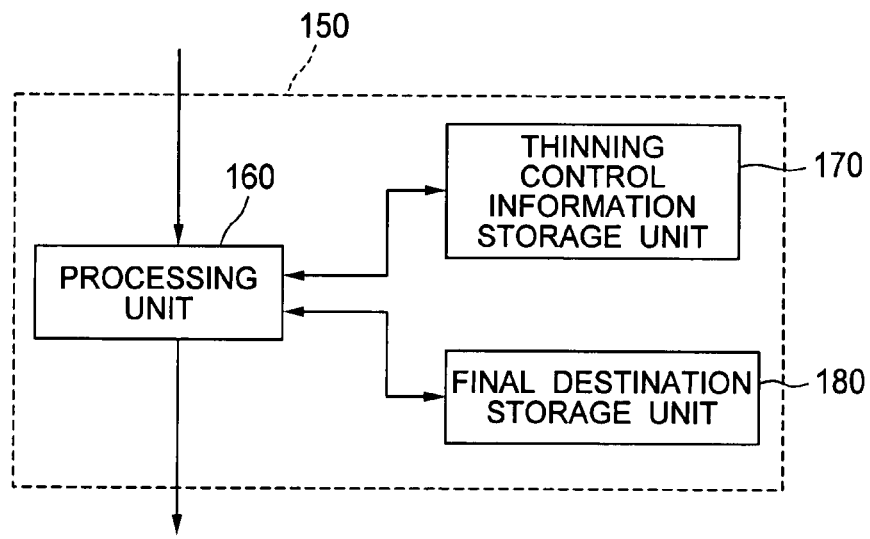
FIG. 5 is an explanatory chart showing the content of thinning control information.
FIG. 6 is a block diagram showing the configuration of an input command processing unit.

FIG. 5 shows thinning control information in the case where an input command is a move command. In this case, an application program A is an application program used by a user to, e.g., draw a character or picture. As for the application program A, setting is made such that thinning processing is executed by processing a move command every 100 msec if the type of a window serving as an object of operation (i.e., a display area) is a text input area, menu area, or title bar area and that thinning processing is not performed if the type of the window serving as the object of operation is a drawing area used by a user to draw a character or picture using a stylus.

Such thinning control information is stored in advance in a storage device (not shown) such as a hard disk and read from the storage device into the input command processing unit 150 at startup of the input command processing unit 150. Note that a thinning control information setting unit may be separately provided to enable a user to make an addition to, delete, and change the setting of thinning control information. Alternatively, thinning control information may be modified on the basis of input commands previously processed and processing of an application program resulting from the input commands or the amount of transmitted data at the time of processing the input commands. In this case, for example, if the amount of transmitted data is large, a thinning processing method to be used is switched from one without thinning processing to one in which thinning processing is performed every 100 msec.

Note that the input command processing unit 150 has a processing unit 160 which executes thinning processing for an input command, a thinning control information storage unit 170 which stores thinning control information read from the storage device (not shown), and a final destination storage unit 180 which stores the final destination of a move command, as shown in FIG. 6.

Figure 7:
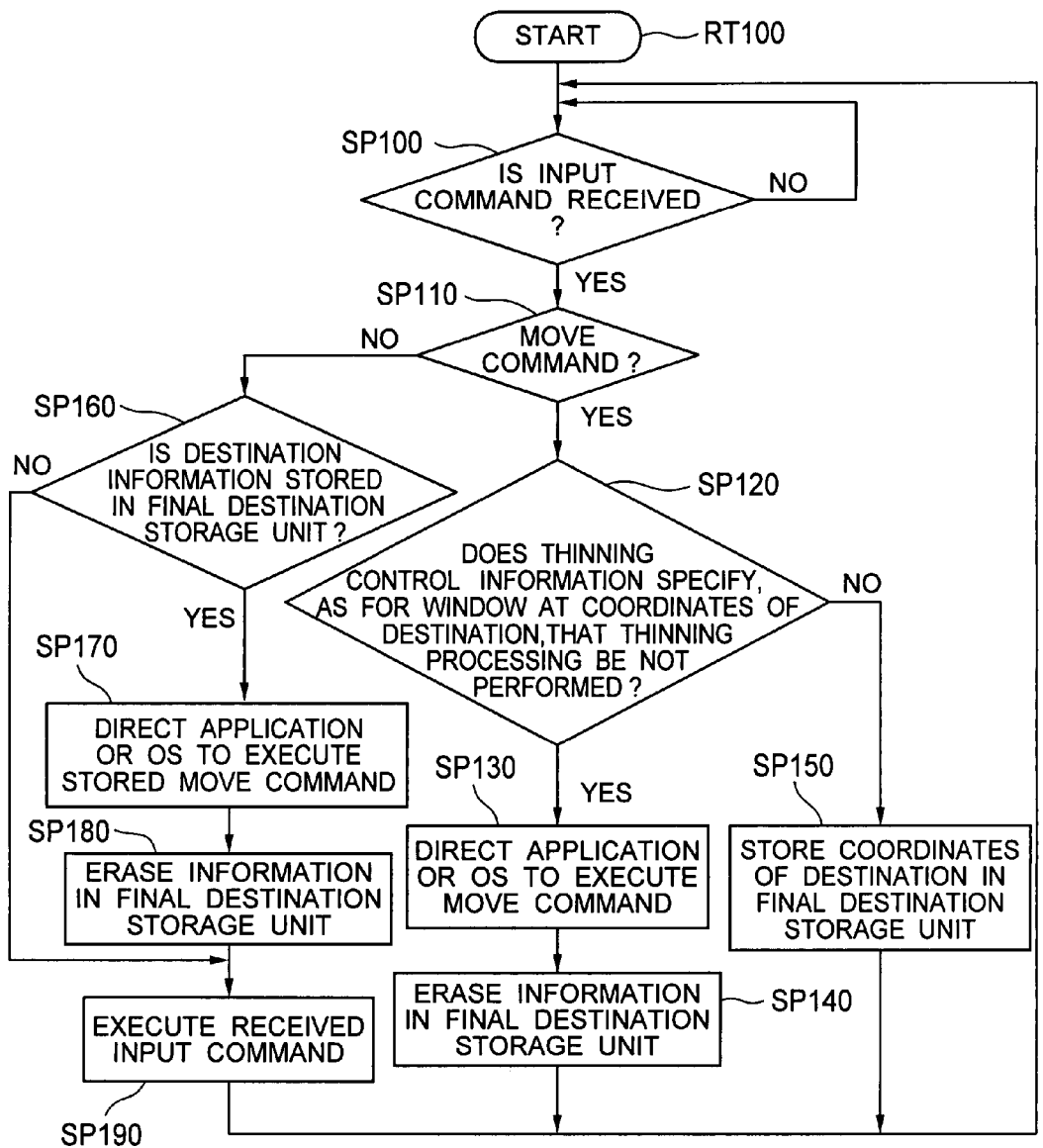
FIG. 7 is a flowchart showing a first input command procedure.

FIG. 7 shows a first input command procedure RT100 to be performed by the input command processing unit 150. Referring to FIG. 7, when the input command processing unit 150 enters the input command processing procedure RT100, it determines in step SP100 whether an input command is received. If an affirmative result is obtained in step SP100, the input command processing unit 150 shifts to step SP110 to determine whether the received input command is a move command. On the other hand, if a negative result is obtained in step SP100, the input command processing unit 150 waits until it receives an input command.

If an affirmative result is obtained in step SP110, the input command processing unit 150 shifts to step SP120 to determine whether thinning control information specifies, as for a window at the coordinates of a destination, that thinning processing be not performed.

If an affirmative result is obtained in step SP120, the input command processing unit 150 shifts to step SP130 to direct the operating system 90 or application program 80 to execute the move command. If the input command processing unit 150 directs the operating system 90 to execute the move command, the operating system 90 sends out the input command to the application program 80. The application program 80 generates a draw instruction on the basis of the input command and issues the draw instruction to the display image generation unit 50 in the operating system 90.

In step SP140, the input command processing unit 150 erases unnecessary final destination information stored in the final destination storage unit 180 and returns to step SP100 to repeat the above-described operation.

On the other hand, if a negative result is obtained in step SP120, the input command processing unit 150 shifts to step SP150. In step SP150, the input command processing unit 150 stores the coordinates of a destination as final destination information in the final destination storage unit 180 to give directions to execute the move command later and then returns to step SP100 to repeat the above-described operation.

If a negative result is obtained in step SP110, the input command processing unit 150 shifts to step SP160 to determine whether final destination information is stored in the final destination storage unit 180.

An affirmative result obtained in step SP160 indicates that the operating system 90 or the like is not directed to execute a move command on the basis of final destination information stored in the final destination storage unit 180. If an affirmative result is obtained, the input command processing unit 150 shifts to step SP170 to direct the operating system 90 or application program 80 to execute a stored move command.

In the next step (step SP180), the input command processing unit 150 erases the unnecessary final destination information stored in the final destination storage unit 180 and shifts to step SP190. In step SP190, the input command processing unit 150 executes the received input command and then returns to step SP100 to repeat the above-described operation.

On the other hand, if a negative result is obtained in step SP160, the input command processing unit 150 shifts to step SP190. In step SP190, the input command processing unit 150 executes the received input command and then returns to step SP100 to repeat the above-described operation.

Figure 8:
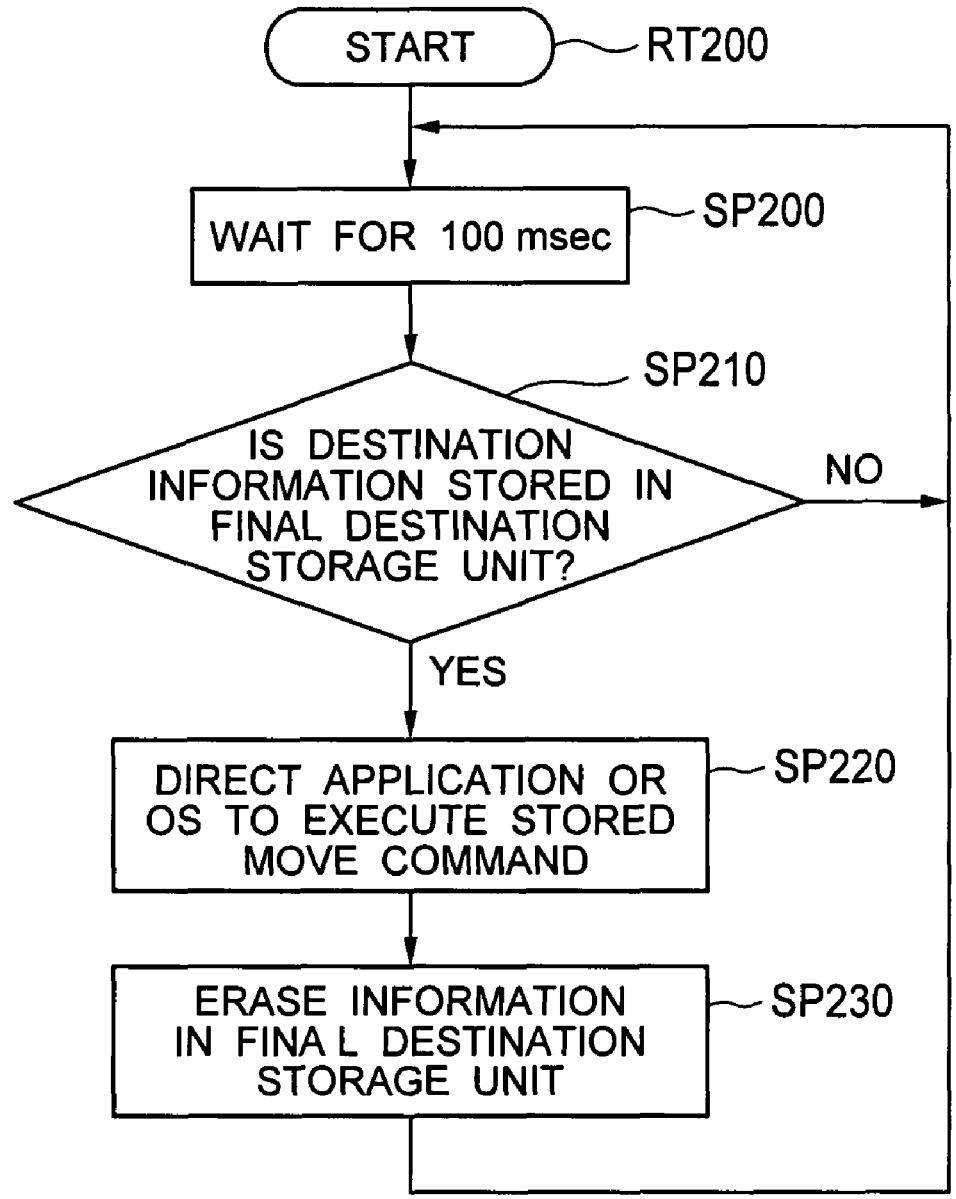
FIG. 8 is a flowchart showing a second input command procedure.

FIG. 8 shows a second input command procedure RT200 to be performed by the input command processing unit 150. In this embodiment, the input command processing unit 150 executes the first and second input command procedures RT100 and RT200 in parallel.

Referring to FIG. 8, when the input command processing unit 150 enters the second input command procedure RT200, it waits for 100 msec in step SP200 and shifts to the next step (step SP210) to determine whether final destination information is stored in the final destination storage unit 180.

An affirmative result obtained in step SP210 indicates that the operating system 90 or the like is not directed to execute a move command on the basis of final destination information stored in the final destination storage unit 180. If an affirmative result is obtained, the input command processing unit 150 shifts to step SP220 to direct the operating system 90 or application program 80 to execute a stored move command.

In the next step (step SP230), the input command processing unit 150 erases the unnecessary final destination information stored in the final destination storage unit 180 and then returns to step SP200 to repeat the above-described operation. On the other hand, if a negative result is obtained in step SP210, the input command processing unit 150 returns to step SP200 to further wait for 100 msec.

As described above, the input command processing unit 150 processes and executes a move command every 100 msec when executing thinning processing for a move command.

Figure 9:
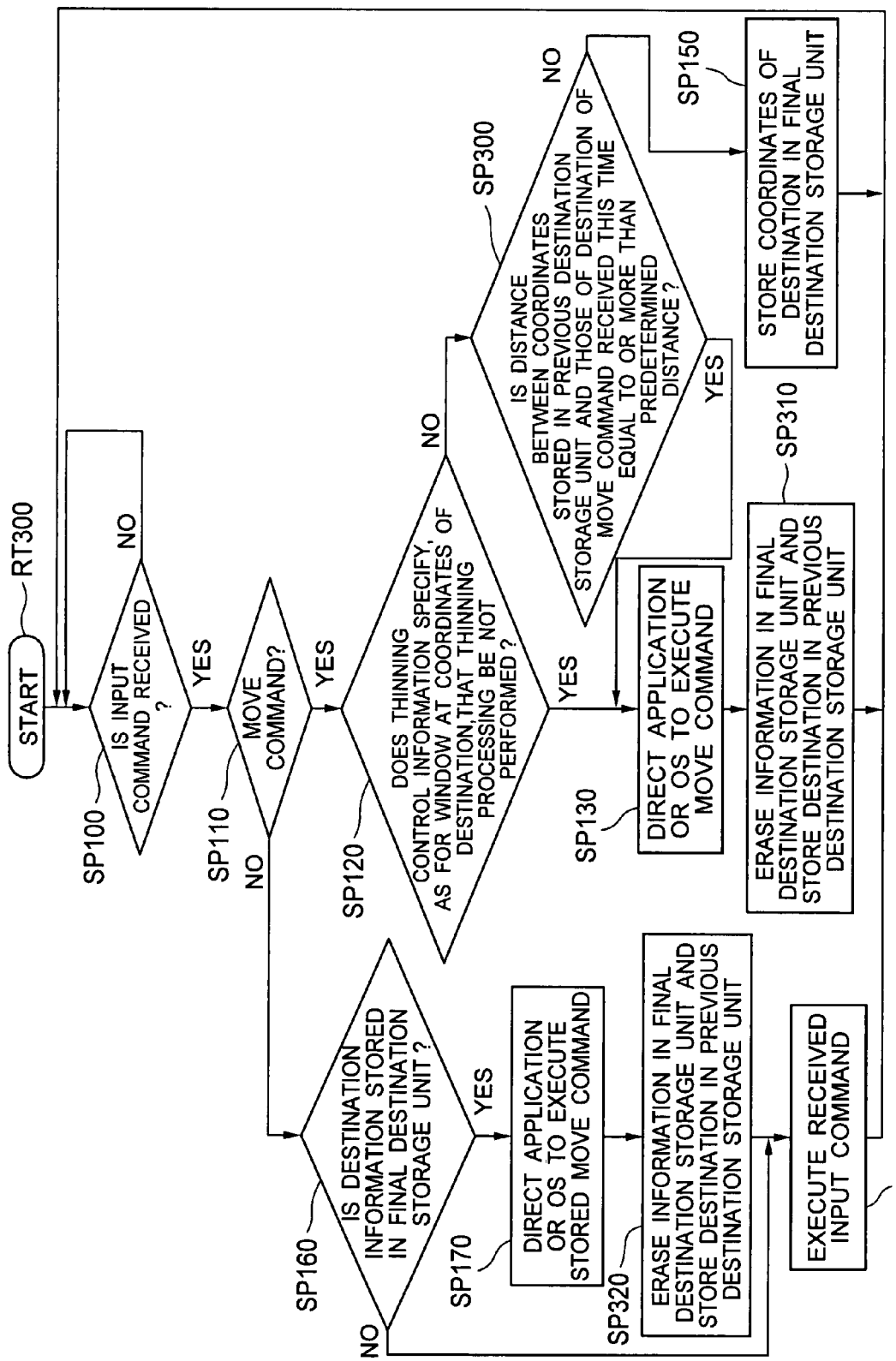
FIG. 9 is a flowchart showing a first input command procedure according to another modification.

FIG. 9 shows a first input command procedure RT300 as a modification of the first input command procedure RT100 to be performed by the input command processing unit 150. In this case, the input command processing unit 150 has previous destination storage unit (not shown) in which a destination of a move command is stored when it directs the operating system 90 or application program 80 to execute the move command.

More specifically, if a negative result is obtained in step SP120 of the first input command procedure RT300, the input command processing unit 150 shifts to step SP300 to determine whether the distance between coordinates stored in the previous destination storage unit and the coordinates of a destination of a move command received this time is equal to or more than a predetermined distance.

If an affirmative result is obtained in step SP300, the input command processing unit 150 shifts to step SP130 to direct the operating system 90 or application program 80 to execute the move command. In the next step (step SP310), the input command processing unit 150 erases the unnecessary destination information stored in the final destination storage unit 180 and stores the destination in the previous destination storage unit.

On the other hand, if a negative result is obtained in step SP300, the input command processing unit 150 shifts to step SP150. In step SP150, the input command processing unit 150 stores the coordinates of the destination in the final destination storage unit 180 as final destination information to give directions to execute the move command later.

Note that if an affirmative result is obtained in step SP160, the input command processing unit 150 shifts to step SP170 to direct the operating system 90 or application program 80 to execute a stored move command and shifts to the next step (step SP320) to erase unnecessary final destination information stored in the final destination storage unit 180 and store a destination in the previous destination storage unit.

As described above, the input command processing unit 150 can process and execute a move command for every predetermined travel distance when executing thinning processing for a move command. Note that the input command processing unit 150 can calculate a travel distance on the basis of the latest position of a pointer processed in the server device 20, if it can obtain the latest position of the pointer from the operating system 90 and that this eliminates the need to separately provide the previous destination storage unit in this case.

The input command processing unit 150 can also process and execute a move command for every predetermined number of times of reception of a move command when executing thinning processing for a move command.

As described above, it is possible to adaptively vary the level of thinning for an input command according to the type of an application program or window serving as an object of operation by executing the first and second input command procedures RT100 and RT200 in parallel.

Accordingly, if an object of operation with an input command is an application program or window which frequently updates a large area, a temporary increase in delay time can be suppressed by increasing the level of thinning for an input command.

If an object of operation with an input command is an application program or window which updates a small area (e.g., when line drawing is performed in a small drawing area using a stylus or mouse), the level of thinning for an input command is reduced. This makes it possible to frequently transmit modified image data to the client device 30 with shorter delay time during an operation of a stylus or mouse and thus perform line drawing while following an operation of the stylus or mouse.

Note that the above-described embodiment is merely an example and not intended to limit the present invention. More specifically, although two levels of thinning, a level involving processing and execution of a move command every 100 msec and a level not involving thinning processing, are prepared as options for the level of thinning for an input command in the embodiment, three or more levels of thinning may be prepared.

In the above-described embodiment, the level of thinning for an input command is controlled on the basis of the type of an application program or window serving as an object of operation with an input command. However, the level of thinning for an input command may be controlled according to the load on the network 40 between the server device 20 and the client device 30.

More specifically, the level of thinning may be controlled on the basis of the duration of communication between the server device 20 and the client device 30 or the amount of unsent data held in the display image transmission unit 60 (image data transmission queue) of the server device 20. The level of thinning for an input command may be reduced if the communication duration or the amount of unsent data is small and may be increased if the communication duration or the amount of unsent data is large.

Note that even with such control, if an object of operation with an input command is an application program or window which updates a small area (e.g., when line drawing is performed in a small drawing area using a stylus or mouse as in the above-described embodiment), the amount of data serving as an object of transmission is small, and thus, the amount of unsent data after starting operation becomes small.

As a result, the level of thinning for an input command becomes low. This makes it possible to frequently transmit modified image data to the client device 30 with shorter delay time during an operation of a stylus or mouse and thus perform line drawing while following an operation of the stylus or mouse.

The level of thinning for an input command may be controlled according to the load on various signal processing units (processors) of the server device 20 and client device 30. More specifically, if the load on a processor of the server device 20 is low, the level of thinning for an input command may be reduced. On the other hand, if the load is high, the level of thinning may be increased.

Note that even with such control, if an object of operation with an input command is an application program or window which updates a small area (e.g., when line drawing is performed in a small drawing area using a stylus or mouse as in the above-described embodiment), the amount of image data serving as an object of transmission is small, and thus, the load on a processor required for compression of the image data becomes low.

As a result, the level of thinning for an input command becomes low, as in the above-described case. This makes it possible to frequently transmit modified image data to the client device 30 with shorter delay time during an operation of a stylus or mouse and thus perform line drawing while following an operation of the stylus or mouse.

Figure 10:
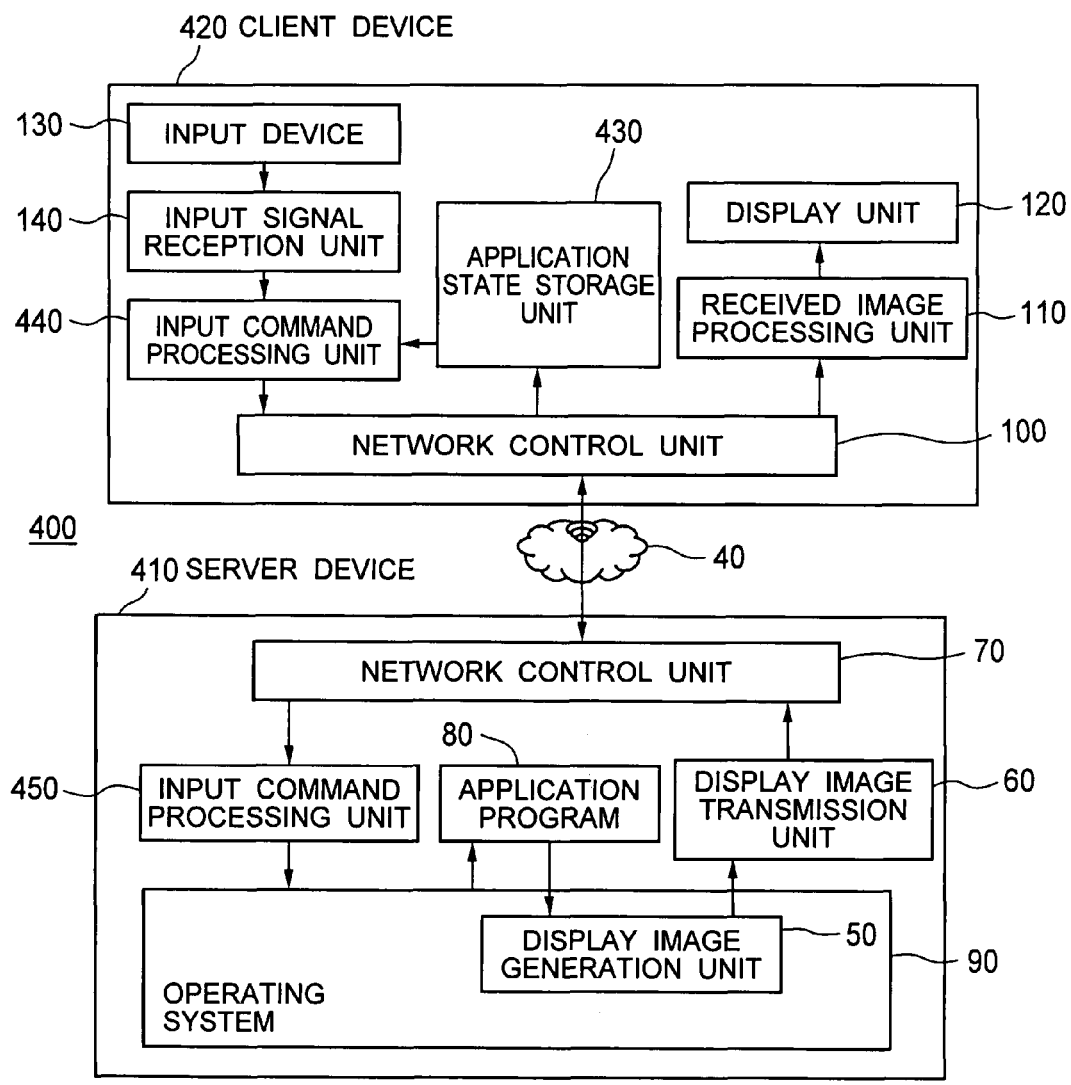
FIG. 10 is a block diagram showing the configuration of a remote control system according to another embodiment.

Control of the level of thinning for an input command may be performed by a client device. FIG. 10 shows the configuration of a remote control system 400 according to another embodiment. In this case, a client device 420 has an application state storage unit 430 and an input command processing unit 440.

The application state storage unit 430 stores application state information indicating the presence or absence of focus in an application program or window running on a server device 410 and the display position of the application program or window. The client device 420 receives application state information transmitted from the server device 410 via a network 40 at regular intervals or every time the state of an application program changes and stores it in the application state storage unit 430.

The input command processing unit 440 holds thinning control information. When the input command processing unit 440 receives an input command from an input signal reception unit 140, it reads out application state information from the application state storage unit 430, thereby obtaining the type of an application program or window serving as an object of operation with the input command.

The input command processing unit 440 performs thinning processing for an input command serving as an object of transmission on the basis of the details of the input command, the type of an application program or window serving as an object of operation with the input command, and thinning control information.

As described above, thinning processing for an input command in the client device 420 makes it possible to reduce traffic from the client device 420 to the server device 410.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server device which receives a control instruction transmitted from a terminal device via a network and generates and transmits image data to be displayed on the terminal device in accordance with the received control instruction, comprising:

a storage unit configured to store a set of the control instruction, an application program serving as an object of operation with the control instruction, and a thinning processing method for the control instruction associated with one another, the thinning processing method being set based on a type of area drawn by the application program;

a reception unit configured to receive a plurality of the control instructions transmitted from the terminal device;

a thinning processing unit configured to, if an object of operation with the control instructions received by the reception unit is the application program stored in the storage unit in association with the control instruction, execute thinning processing for the plurality of control instructions using the thinning processing method stored in the storage unit in association with the control instruction;

an image data generation unit configured to generate the image data to be displayed on the terminal device in accordance with the control instructions after the thinning processing; and a transmission unit configured to transmit the generated image data to the terminal device.

2. The server device according to claim 1, wherein the control instruction includes a piece of positional information indicating a position of a display screen of the terminal device where the control instruction is input, and the thinning processing unit identifies the application program serving as the object of operation with the control instructions received by the reception unit, using the pieces of positional information included in the control instructions.

3. The server device according to claim 1, wherein the thinning processing unit adopts the application program which is serving as an object of operation with the control instruction at a time when the reception unit receives the control instructions, as the object of operation with the received control instructions.

4. The server device according to claim 1, wherein the thinning processing unit generates history information having the control instruction for which the thinning processing is previously executed and a processing result obtained by executing the thinning processing for the control instruction associated with each other and modifies the thinning processing method stored in the storage unit in association with the control instruction using the generated history information.

5. The server device according to claim 1, wherein the thinning processing unit modifies contents stored in the storage unit in response to an input operation by a user.

6. A server device which receives a control instruction transmitted from a terminal device via a network and generates and transmits image data to be displayed on the terminal device in accordance with the received control instruction, comprising:

a storage unit configured to store a set of the control instruction, a display area of a display screen of the terminal device serving as an object of operation with the control instruction, and a thinning processing method for the control instruction associated with one another, the thinning processing method being set based on a size of the display area;

a reception unit configured to receive a plurality of the control instructions transmitted from the terminal device;

a thinning processing unit configured to, if an object of operation with the control instructions received by the reception unit is the display area stored in the storage unit in association with the control instruction, execute thinning processing for the plurality of control instructions using the thinning processing method stored in the storage unit in association with the control instruction;

an image data generation unit configured to generate the image data to be displayed on the terminal device in accordance with the control instructions after the thinning processing; and a transmission unit configured to transmit the generated image data to the terminal device.

7. The server device according to claim 6, wherein
the control instruction includes a piece of positional information indicating a position of the display screen of the terminal device where the control instruction is input, and
the thinning processing unit identifies the display area serving as the object of operation with the control instructions received by the reception unit, using the pieces of the positional information included in the control instructions.

8. The server device according to claim 6, wherein
the thinning processing unit adopts the display area which is serving as an object of operation with the control instruction at a time when the reception unit receives the control instructions, as the object of operation with the received control instructions.

9. The server device according to claim 6, wherein
the thinning processing unit generates history information having the control instruction for which the thinning processing is previously executed and a processing result obtained by executing the thinning processing for the control instruction associated with each other and modifies the thinning processing method stored in the storage unit in association with the control instruction using the generated history information.

10. The server device according to claim 6, wherein
the thinning processing unit modifies contents stored in the storage unit in response to an input operation by a user.

11. A server device control instruction processing method for receiving a control instruction transmitted from a terminal device via a network and generating and transmitting image data to be displayed on the terminal device in accordance with the received control instruction, comprising:

storing, in a storage unit, a set of the control instruction, an application program serving as an object of operation with the control instruction, and a thinning processing method for the control instruction associated with one another, the thinning processing method being set based on a type of area drawn by the application program;

receiving a plurality of the control instructions transmitted from the terminal device;

if an object of operation with the control instructions received is the application program stored in the storage unit in association with the control instruction, executing thinning processing for the plurality of control instructions using the thinning processing method stored in the storage unit in association with the control instruction;

generating the image data to be displayed on the terminal device in accordance with the control instructions after the thinning processing; and transmitting the generated image data to the terminal device.

12. A server device control instruction processing method for receiving a control instruction transmitted from a terminal device via a network and generating and transmitting image data to be displayed on the terminal device in accordance with the received control instruction, comprising:

storing, in a storage unit, a set of the control instruction, a display area of a display screen of the terminal device serving as an object of operation with the control instruction, and a thinning processing method for the control instruction associated with one another, the thinning processing method being set based on a size of the display area;

receiving a plurality of the control instructions transmitted from the terminal device;

if an object of operation with the control instructions received is the display area stored in the storage unit in association with the control instruction, executing thinning processing for the plurality of control instructions using the thinning processing method stored in the storage unit in association with the control instruction;

generating the image data to be displayed on the terminal device in accordance with the control instructions after the thinning processing; and transmitting the generated image data to the terminal device.

13. A terminal device which transmits a control instruction input from an input unit to a server device via a network and receives and displays image data transmitted from the server device via the network, comprising:

an application state storage unit configured to store application state information indicating an operating state of an application program transmitted from the server device via the network;

a storage unit configured to store a set of the control instruction, an application program serving as an object of operation with the control instruction, and a thinning processing method for the control instruction associated with one another, the thinning processing method being set based on a type of area drawn by the application program;

an input unit configured to input a plurality of the control instructions;

a thinning processing unit configured to identify an object of operation with the control instructions input by the input unit using the application state information stored in the application state storage unit and, if the identified object of operation with the control instructions is the application program stored in the storage unit in association with the control instruction, execute thinning processing for the plurality of control instructions using the thinning processing method stored in the storage unit in association with the control instruction; and a transmission unit configured to transmit the control instructions after the thinning processing to the server device via the network.

14. A terminal device which transmits a control instruction input from an input unit to a server device via a network and receives and displays image data transmitted from the server device via the network, comprising:

a display area state storage unit configured to store display area state information indicating a display state of each of display areas constituting a display screen of the terminal device transmitted from the server device via the network;

a storage unit configured to store a set of the control instruction, one of the display areas serving as an object of operation with the control instruction, and a thinning processing method for the control instruction associated with one another, the thinning processing method being set based on a size of the display area;

an input unit configured to input a plurality of the control instructions;

a thinning processing unit configured to identify an object of operation with the control instructions input by the input unit using the display area state information stored in the display area state storage unit and, if the identified object of operation with the control instructions is the display area stored in the storage unit in association with the control instruction, execute thinning processing for the plurality of control instructions using the thinning processing method stored in the storage unit in association with the control instruction; and a transmission unit configured to transmit the control instructions after the thinning processing to the server device via the network.

15. A server device which receives a control instruction transmitted from a terminal device via a network and generates and transmits image data to be displayed on the terminal device in accordance with the received control instruction, comprising:

storage configured to store in association with one another the control instruction, an application program serving as an object of operation with the control instruction, and a thinning processing method for the control instruction, the thinning processing method being set based on a type of area drawn by the application program;

a receiver configured to receive a plurality of the control instructions transmitted from the terminal device;

a thinning processor configured to, if an object of operation with the control instructions received by the receiver is the application program stored in the storage in association with the control instruction, execute thinning processing for the plurality of control instructions using the thinning processing method stored in the storage in association with the control instruction;

an image generator configured to generate the image data to be displayed on the terminal device in accordance with the control instructions after the thinning processing; and a transmitter configured to transmit the generated image data to the terminal device.

16. A server device which receives a control instruction transmitted from a terminal device via a network and generates and transmits image data to be displayed on the terminal device in accordance with the received control instruction, comprising:

storage configured to store in association with one another the control instruction, a display area of a display screen of the terminal device serving as an object of operation with the control instruction, and a thinning processing method for the control instruction, the thinning processing method being set based on a size of the display area;

a receiver configured to receive a plurality of the control instructions transmitted from the terminal device;

a thinning processor configured to, if an object of operation with the control instructions received by the receiver is the display area stored in the storage in association with the control instruction, execute thinning processing for the plurality of control instructions using the thinning processing method stored in the storage in association with the control instruction;

an image generator configured to generate the image data to be displayed on the terminal device in accordance with the control instructions after the thinning processing; and a transmitter configured to transmit the generated image data to the terminal device.

* * * * *